US007097335B1

(12) United States Patent
Tsai et al.

(10) Patent No.: US 7,097,335 B1
(45) Date of Patent: Aug. 29, 2006

(54) VEHICLE LIGHT BEAM ADJUSTING DEVICE

(76) Inventors: Chih-Ming Tsai, 3F, No. 23, Sanshr South 8th Lane, Sec. 2, Situn Road, Taichung 407 (TW); Jung An Wang, No. 15, Szwei Road, Nanyao Li, Changhua 500 (TW)

( * ) Notice: Subject to any disclaimer, the term of this patent is extended or adjusted under 35 U.S.C. 154(b) by 0 days.

(21) Appl. No.: 11/047,839

(22) Filed: Feb. 1, 2005

(51) Int. Cl.
*F21V 11/00* (2006.01)
*B60Q 1/04* (2006.01)

(52) U.S. Cl. ....................... 362/539; 362/321; 362/513

(58) Field of Classification Search ................ 362/256, 362/274, 279, 280, 281, 283, 284, 321, 324, 362/325, 512, 513, 539
See application file for complete search history.

(56) References Cited

U.S. PATENT DOCUMENTS 1,801,864 A 4/1931 Hutchison et al.
2,022,295 A 11/1935 Melish
5,017,327 A 5/1991 Bamber ....................... 362/188
6,300,718 B1 10/2001 Taniuchi et al. .............. 315/82
6,386,744 B1 * 5/2002 Scholl ......................... 362/539
6,565,245 B1 * 5/2003 Yokoi .......................... 362/539
6,824,302 B1 * 11/2004 Akizuki et al. ............. 362/512

* cited by examiner

*Primary Examiner*—Y. My Quach-Lee
(74) *Attorney, Agent, or Firm*—Charles E. Baxley

(57) ABSTRACT

A vehicle light beam adjusting device includes a light device disposed within a reflector, a housing attached to the reflector and having one or more lower passages formed between spacers, and having one or more upper openings. A casing is slidably attached onto the housing, and includes one or more lower passages formed between spacers, and having one or more upper openings. An actuating device may selectively align the passages of the casing and the housing with each other, to allow light to emit through the passages of the casing and the housing, may selectively block the passages of the casing and the housing with the spacers, to selectively open or block the passages of the casing and the housing.

8 Claims, 4 Drawing Sheets

VEHICLE LIGHT BEAM ADJUSTING DEVICE

BACKGROUND OF THE INVENTION

1. Field of the Invention

The present invention relates to a vehicle headlight, and more particularly to a vehicle headlight having a light beam adjusting device for adjusting the headlight to different light beams or to different light intensities.

2. Description of the Prior Art

Typical vehicle headlights comprise a light beam adjusting device to adjust the headlight to different light beams or to different light intensities, such as to high beam and low beam. For example, the typical vehicle light beam adjusting devices comprise a light bulb slidably received in a reflector, and movable relative to the reflector, in order to adjust to different light beams.

For example, U.S. Pat. No. 1,801,864 to Hutchison et al. discloses one of the typical vehicle headlights also including a light beam adjusting device having a light bulb slidably received in a reflector, and movable relative to the reflector by a solenoid core that is slidably received in solenoid coil, in order to adjust to different light beams. However, some of the light portion generated by the light bulb may also be reflected or emitted upwardly by the reflector.

U.S. Pat. No. 2,022,295 to Melish discloses another typical vehicle headlight including a light beam adjusting device having a light bulb slidably received in a reflector, and tiltable relative to the reflector by a series of electromagnets, in order to adjust to different light beams. However, similarly, some of the light portion generated by the light bulb may also be reflected or emitted upwardly by the reflector.

U.S. Pat. No. 5,017,327 to Bamber discloses a further typical vehicle headlight including a light beam adjusting device having a light bulb slidably received in a reflector, and adjustable relative to the reflector by a threaded screw, in order to adjust to different light beams. However, similarly, some of the light portion generated by the light bulb may also be reflected or emitted upwardly by the reflector.

U.S. Pat. No. 6,300,718 to Taniuchi et al. discloses a still further typical vehicle headlight including a light beam adjusting device having a light bulb slidably received in a reflector and coupled to a light source base which is tiltable relative to the reflector by an electromagnetic solenoid, in order to adjust to different light beams. However, similarly, some of the light portion generated by the light bulb may also be reflected or emitted upwardly by the reflector.

The present invention has arisen to mitigate and/or obviate the afore-described disadvantages of the conventional vehicle light beam adjusting devices.

SUMMARY OF THE INVENTION

The primary objective of the present invention is to provide a vehicle headlight including a light beam adjusting device for adjusting the headlight to different light beams or to different light intensities, and for preventing the light portion generated by the light bulb from being reflected or emitted upwardly by the reflector of the vehicle headlight.

In accordance with one aspect of the invention, there is provided a vehicle light beam adjusting device comprising a reflector, a light device disposed within the reflector, for generating light beams, and for allowing the light beams to be reflected by the reflector, a housing including a base attached to the reflector, and including a lower portion having at least one passage formed therein and defined between spacers, and including an upper portion having at least one opening formed therein, for allowing the light generated by the light device to emit out through the passage and the opening of the housing, a casing slidably attached onto the housing, and including a lower portion having at least one passage formed therein and defined between spacers, and including an upper portion having at least one opening formed therein, for allowing the light generated by the light device to emit out through the passage and the opening of the casing, and an actuating device for selectively aligning the passage of the casing with the passage of the housing, and for selectively aligning the spacers of the casing with the passage of the housing, and to selectively open or block the passage of the housing.

The actuating device includes a spring biasing device for biasing the casing relative to the housing, to selectively align the passage of the casing with the passage of the housing. The housing includes an aperture formed in the base thereof, to receive the light device, and to allow the light device to be disposed and engaged within the reflector.

The actuating device includes an actuating device attached to the housing, and coupled to the casing, to selectively move the casing relative to the housing. The casing includes at least one ear extended therefrom, and the actuating device includes an outer receptacle attached to the housing, and an inner core slidably received in the outer receptacle and movable relative to the outer receptacle, and coupled to the ear of the casing, to move the casing relative to the housing.

A cap may further be provided and engaged onto the housing. The cap includes at least one spring member coupled to the casing, to resiliently couple the cap to the casing. The casing includes at least one peg extended therefrom, and the cap includes at least one projection extended therefrom, the spring member is coupled between the peg of the casing and the projection of the cap.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
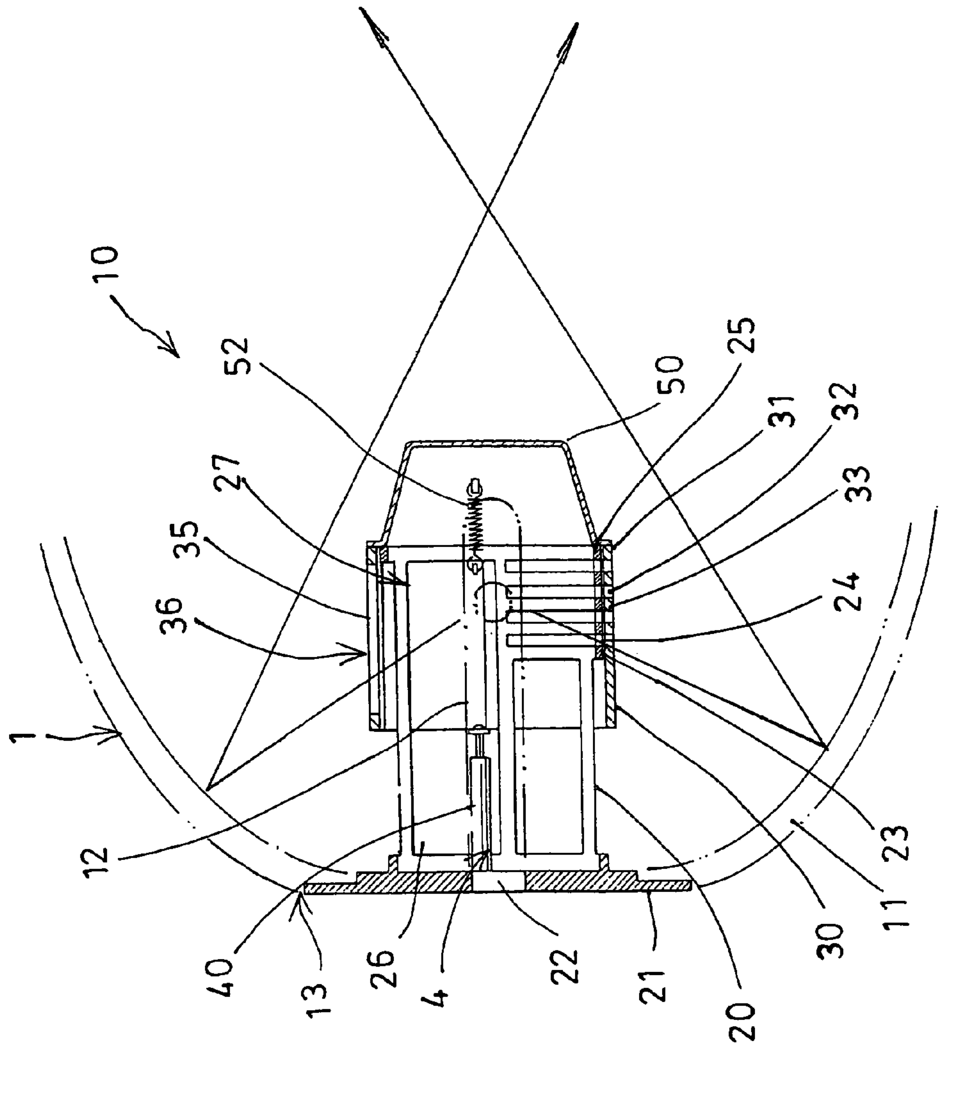
FIG. 1 is a partial cross sectional view of a vehicle light beam adjusting device in accordance with the present invention.
Figure 2:
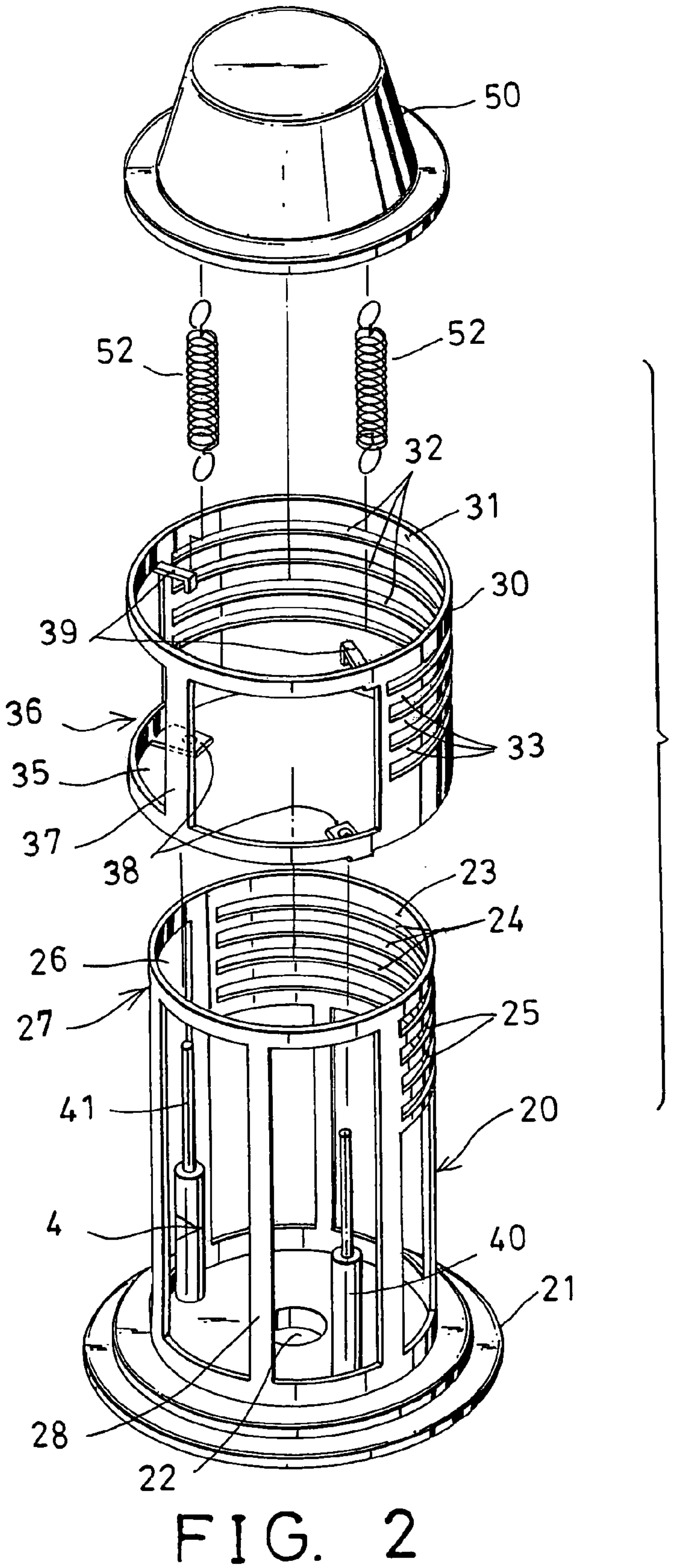
FIG. 2 is a partial exploded view of the vehicle light beam adjusting device.
Figure 4:
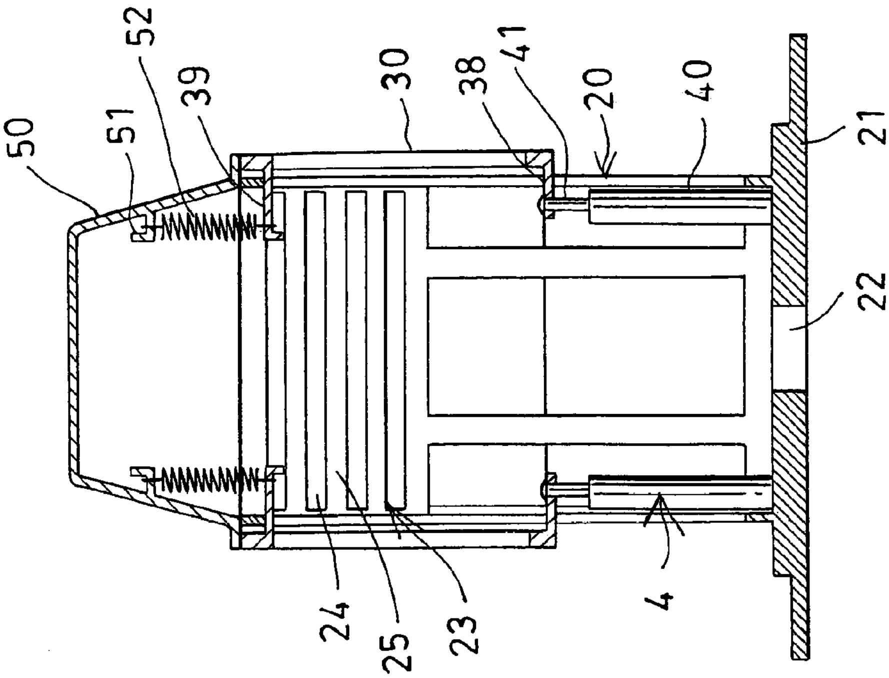
FIG. 4 is a partial cross sectional view taken along lines 4—4 of FIG. 3.
Figure 3:
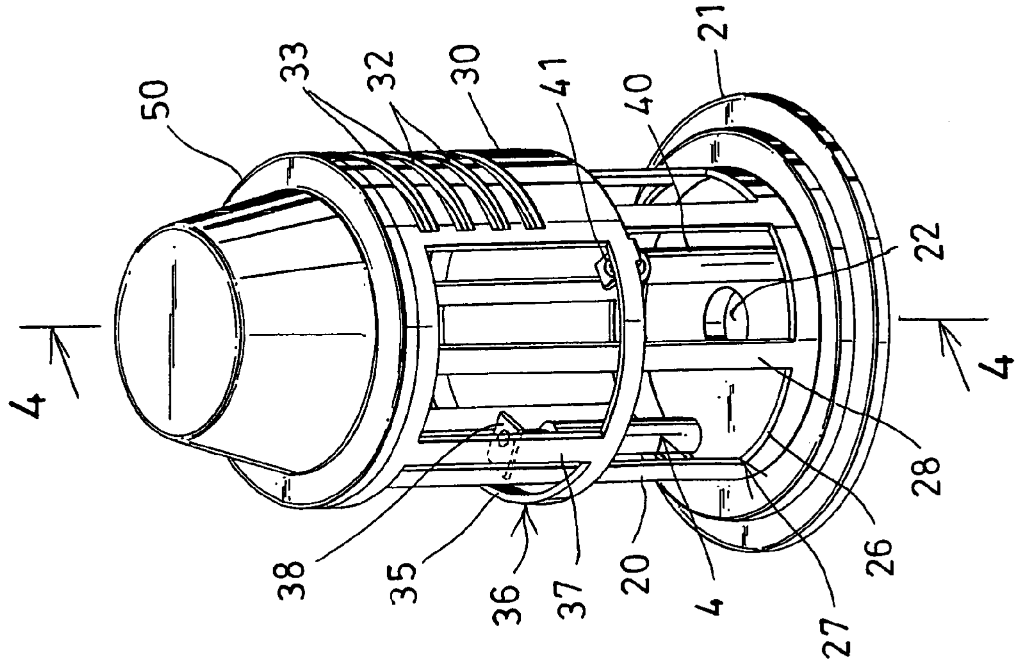
FIG. 3 is a partial perspective view of the vehicle light beam adjusting device.
Figure 5:
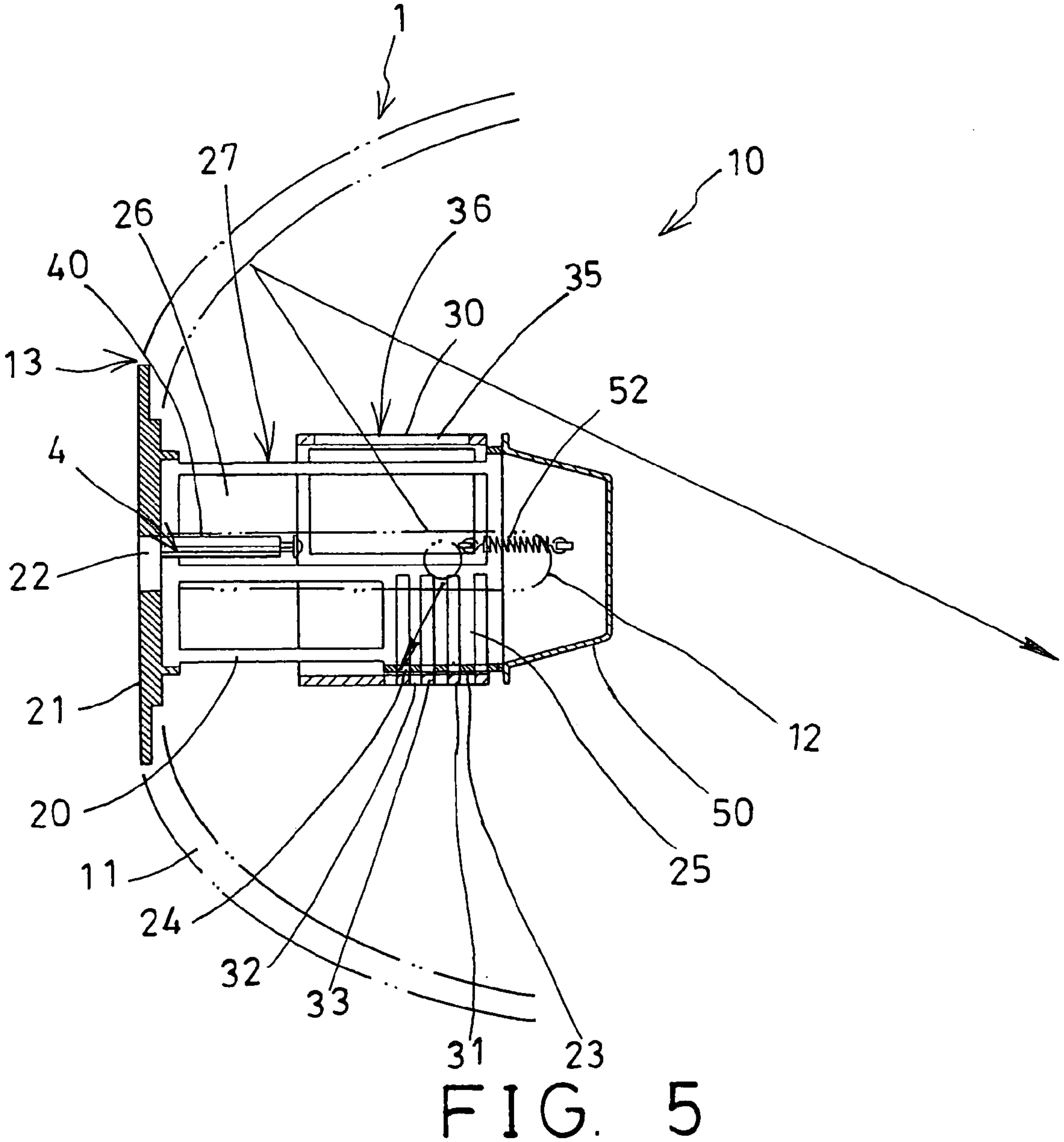
FIG. 5 is a partial cross sectional view similar to FIG. 1, illustrating the operation of the vehicle light beam adjusting device.

Referring to the drawings, and initially to FIGS. 1–4, a vehicle headlight 1 in accordance with the present invention comprises a light beam adjusting device 10 including a reflector 11, a light bulb or light device 12 disposed within the reflector 11, for generating light beams, and for allowing the light beams to be reflected by the reflector 11 (FIGS. 1, 5).

A housing 20 includes a base 21 attached to or secured to the base or root portion or concaved inner portion 13 of the reflector 11, and having an aperture 22 formed therein, for receiving the light device 12, and thus for allowing the light device 12 to be disposed or engaged within the reflector 11, and for allowing the light generated by the light device 12 to be reflected by the reflector 11 (FIGS. 1, 5).

The housing 20 includes a portion, such as a lower portion 23 having one or more passages 24 formed therein and defined between ribs or bars or spacers 25, and includes one or more openings 26 formed in the other portion, such as the upper portion 27 thereof (FIGS. 1, 5) and defined between ribs or bars 28, for allowing the light generated by the light device 12 to be emitted out through the passages 24 and the openings 26 of the housing 20.

A casing 30 is further provided and slidably attached to or engaged onto the housing 20, and includes a portion, such as a lower portion 31 having one or more passages 32 formed therein and defined between ribs or bars or spacers 33, and includes one or more openings 35 formed in the other portion, such as the upper portion 36 thereof (FIGS. 1, 5) and defined between ribs or bars 37, for selectively aligning with the passages 24 and the openings 26 of the housing 20, and also for allowing the light generated by the light device 12 to be selectively emitted out through the passages 32 and the openings 35 of the casing 30.

The casing 30 includes one or more ears 38 extended therefrom, such as extended from a rear portion thereof, for coupling to one or more actuating devices 4 respectively. For example, each of the actuating devices 4 includes an outer receptacle 40 extended from or secured to the base 21 of the housing 20, and an inner core 41 slidably received in the outer receptacle 40, and movable in and out relative to the outer receptacle 40, and coupled to the ears 38 of the casing 30, to move or to adjust the casing 30 relative to the housing 20, and thus to adjust the passages 32 and the spacers 33 of the casing 30 relative to the passages 24 and the spacers 25 of the housing 20 respectively.

For example, the actuating devices 4 may be hydraulic or cylindrical actuators and may include a piston rod 41 slidably received in the outer receptacle 40, and extendible or actuatable to move relative to the receptacle 40; or may be a motorized screw threading device, or may be an electromagnetic device having the core 41 slidably received in the receptacle 40 that is an inductive coil, for example.

The casing 30 further includes one or more pegs 39 extended therefrom, such as extended from a front portion thereof, for coupling to a hood or a cap 50 which may be engaged onto or contacted with or secured to the casing 30. For example, one or more spring biasing devices or spring members 52 may be coupled between projections 51 of the cap 50 and the pegs 39 of the casing 30, to resiliently couple the cap 50 to the casing 30, and to bias or to move the casing 30 away from the base 21 of the housing 20, and thus to align the passages 32 of the casing 30 with the passages 24 of the housing 20 respectively (FIG. 1), and thus to allow the light generated by the light device 12 to be selectively transmitted or emitted out through the passages 24, 32 of the housing 20 and the casing 30.

In operation, as shown in FIG. 1, when the actuating devices 4 have not been actuated or energized or operated, the spring members 52 may bias or move the casing 30 toward the cap 50, or away from the base 21 of the housing 20, in order to align the passages 32 of the casing 30 with the passages 24 of the housing 20 respectively, and thus to allow the light generated by the light device 12 to be selectively transmitted or emitted out through the passages 24, 32 that are formed or located in the lower portions 23, 31 of the housing 20 and the casing 30, and the light may then be reflected and emitted upwardly.

At this moment, and simultaneously, the light generated by the light device 12 may also be selectively emitted out through the openings 26, 35 of the housing 20 and of the casing 30 that are formed or located in the upper portions 27, 36 of the housing 20 and the casing 30, and the light may then be reflected and emitted downwardly to form a high beam or to form a high intensity light beam together with the light reflected and emitted upwardly by the reflector 11.

As shown in FIG. 5, the actuating devices 4 may be selectively actuated or energized or operated to move or to adjust the casing 30 relative to the housing 20 against the spring members 52, in order to align the spacers 33 of the casing 30 with the passages 24 of the housing 20 respectively, and thus to block the passages 24 of the housing 20 respectively, and thus to shield the light and to prevent the light from emitted out through the passages 24 of the housing 20. In addition, the passages 32 of the casing 30 may also be blocked or shielded by the spacers 25 of the housing 20, such that the light may also be blocked or shielded and prevented from emitting out through the passages 32 of the casing 30.

At this moment, only a portion of the light generated by the light device 12 may also be selectively emitted out through the openings 26, 35 of the housing 20 and of the casing 30 that are formed or located in the upper portions 27, 36 of the housing 20 and the casing 30, and the light may then be reflected and emitted downwardly to form a low beam. The light generated by the light device 12 will not be reflected and emitted upwardly by the reflector 11 at this moment.

On the contrary, the spacers 33 of the casing 30 may normally be biased to be aligned with the passages 24 of the housing 20 respectively, by the spring biasing devices or spring members 52, and thus to block the passages 24 of the housing 20 respectively, and thus to shield the light and to prevent the light from emitted out through the passages 24 of the housing 20; and the actuating devices 4 may be selectively actuated or energized or operated to move or to adjust the casing 30 relative to the housing 20 against the spring members 52, in order to align the passages 32 of the casing 30 with the passages 24 of the housing 20 respectively, and thus to allow the light generated by the light device 12 to be selectively emitted out through the passages 24, 32 that are formed or located in the lower portions 23, 31 of the housing 20 and the casing 30, and thus to allow the light to be reflected and emitted upwardly.

The spring biasing devices or spring members 52 and the actuating devices 4 may thus be formed as an actuating means or device for selectively aligning the passages 32, 24 of the casing 30 and of the housing 20 respectively, and for selectively aligning the spacers 33 of the casing 30 with the passages 24 of the housing 20 respectively, and thus to selectively open or block the passages 24 of the housing 20.

Accordingly, the vehicle headlight in accordance with the present invention includes a light beam adjusting device for adjusting the headlight to different light beams or to different light intensities, and for preventing the light portion generated by the light bulb from being reflected or emitted upwardly by the reflector of the vehicle headlight.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A vehicle light beam adjusting: device comprising:

a reflector, a light device disposed within said reflector, for generating light beams, and for allowing the light beams to be reflected by said reflector, a housing including a base attached to said reflector, and including a lower portion having at least one passage formed therein and defined between spacers, and including an upper portion having at least one opening formed therein, for allowing the light generated by said light device to emit out through said at least one passage and said at least one opening of said housing, a casing slidably attached onto said housing, and including a lower portion having at least one passage formed therein and defined between spacers, and including an upper portion having at least one opening formed therein, for allowing the light generated by said light device to emit out through said at least one passage and said at least one opening of said casing, and actuating means for selectively aligning said at least one passage of said casing with said at least one passage of said housing, and for selectively aligning said spacers of said casing with said at least one passage of said housing, and to selectively open or block said at least one passage of said housing.

2. The vehicle light beam adjusting device as claimed in claim 1, wherein said actuating means includes a spring biasing means for biasing said casing relative to said housing, to selectively align said at least one passage of said casing with said at least one passage of said housing.

3. The vehicle light beam adjusting device as claimed in claim 1, wherein said actuating means includes an actuating device attached to said housing, and coupled to said casing, to selectively move said casing relative to said housing.

4. The vehicle light beam adjusting device as claimed in claim 3, wherein said casing includes at least one ear extended therefrom, and said actuating device includes an outer receptacle attached to said housing, and an inner core slidably received in said outer receptacle and movable relative to said outer receptacle, and coupled to said at least one ear of said casing, to move said casing relative to said housing.

5. The vehicle light beam adjusting device as claimed in claim 1 further comprising a cap engaged onto said casing.

6. The vehicle light beam adjusting device as claimed in claim 5, wherein said cap includes at least one spring member coupled to said casing, to resiliently couple said cap to said casing.

7. The vehicle light beam adjusting device as claimed in claim 6, wherein said casing includes at least one peg extended therefrom, and said cap includes at least one projection extended therefrom, said at least one spring member is coupled between said at least one peg of said casing and said at least one projection of said cap.

8. The vehicle light beam adjusting device as claimed in claim 1, wherein said housing includes an aperture formed in said base thereof, to receive said light device, and to allow said light device to be disposed and engaged within said reflector.

* * * * *